Figure 4:
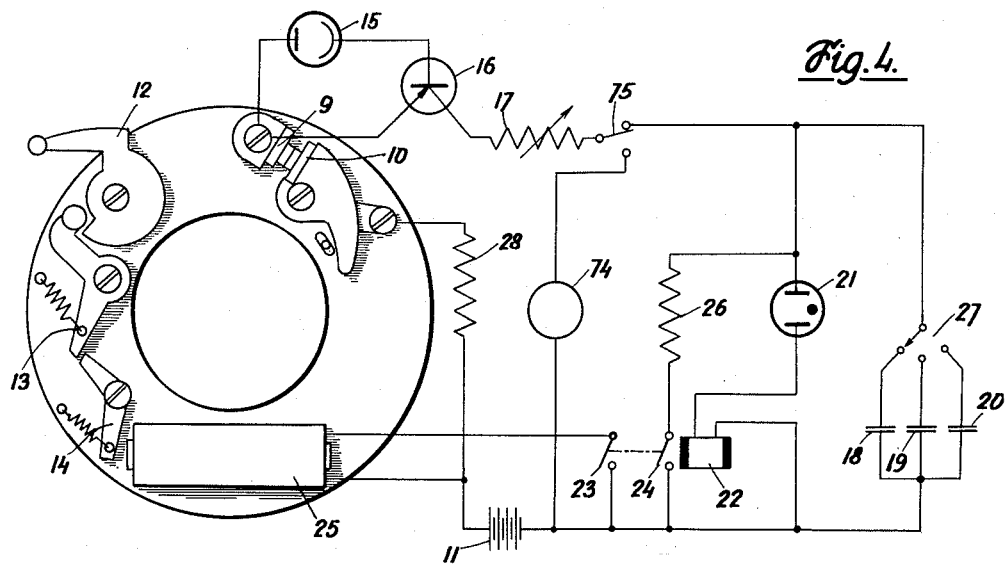

Nov. 13, 1962    J. MATULÍK ETAL    3,063,354
DEVICE FOR AUTOMATICALLY CONTROLLING THE EXPOSURE
TIME FOR PHOTOGRAPHIC PURPOSES
Filed May 23, 1960                               3 Sheets-Sheet 1
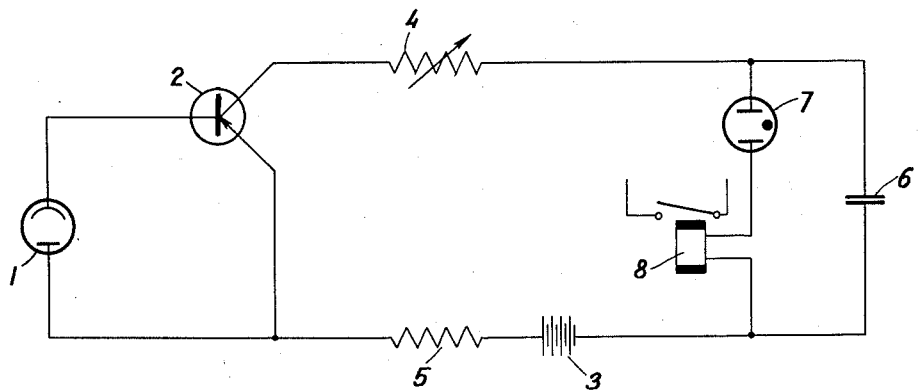
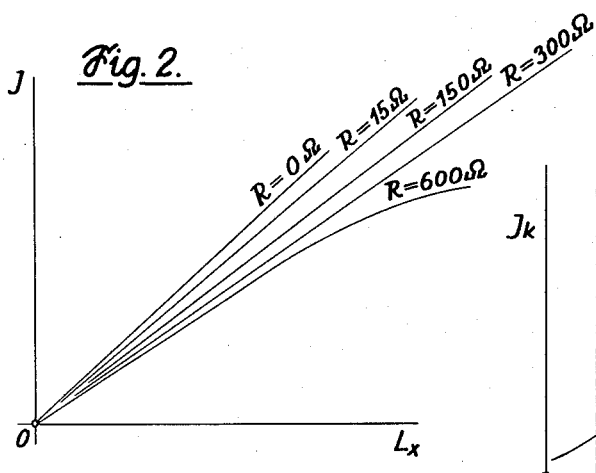
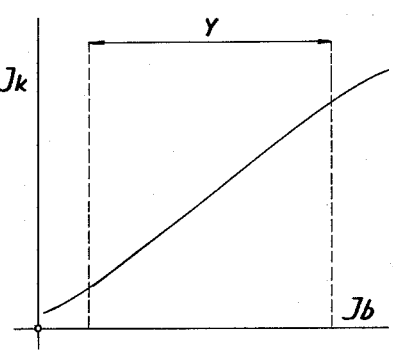
INVENTORS
Josef Matulík ~ Karel Rychlý ~ Josef Punčochář
BY INVENTORS
Josef Matulík, Karel Rychlý, Josef Punčochář
BY Richard ... Ag't

United States Patent Office 3,063,354
Patented Nov. 13, 1962

3,063,354
DEVICE FOR AUTOMATICALLY CONTROLLING THE EXPOSURE TIME FOR PHOTOGRAPHIC PURPOSES
Josef Matulík, Karel Rychlý and Josef Punčochář, all of Gottwaldov, Czechoslovakia, assignors to Meopta, narodni podnik, Prerov, Czechoslovakia
Filed May 23, 1960, Ser. No. 31,070
Claims priority, application Czechoslovakia May 23, 1959
13 Claims. (Cl. 95—10)

The present invention relates to a method and a device for automatically controlling the exposure time for photographic purposes by means of a photo-electric cell and deals more particularly with a method and device for automatically controlling the shutter of a photographic camera.

In photographic cameras which are equipped with automatic means for the control of the exposure time, the electric current from a photo-electric cell actuates, by means of a galvanometer, either the iris diaphragm of the objective or another member provided for control of the exposure time.

In some heretofore used devices of the aforementioned type the deflection of a galvanometer indicator indirectly controls the time during which the shutter is open. Such a mechanism, adapted for a focal plane shutter, actuates a delay-action device when the first curtain is released, said delay-action device deflecting an electric contact until it reaches the indicator of the galvanometer. At this moment the electric current actuates a relay controlling the other curtain of the shutter, which is thus closed.

In order that the automatic control of the exposure time should not depend on the output of the photo-electric cell an auxiliary source of power is sometimes used, the latter being actuated by the measuring mechanism owing to the electrodynamic influence thereof. Said auxiliary source is actuated by mechanical, electric, electro-motoric, photo-electric, pneumatic or hydraulic means. The measuring mechanisms of all such known devices are actuated by the current from the photo-electric cell, said current having a relatively low value (0.5 mw. at the most), which fact is the cause of frequent failures in operation, even if the current is amplified by a transistor amplifier.

In other known devices of the above type an electromagnet releases the curtain of a focal plane shutter for a uniform movement, an electric delay-action member being set in operation, said relay action member consisting of selected numbers of capacitors connected in parallel to determine the correct exposure time by means of a relay actuated by the current from the photo-electric cell (U.S. Patent No. 2,179,717).

A so-called "integration exposure meter" is further known for measuring the exposure time, in which the current from a photo-electric cell and a small accumulator charges or, if required, discharges an electric capacitor during a period which is the product of the intensity and exposure time. (See British Journal of Photography 1938, page 89; Process Engraver's Monthly, January 1938.)

Further it is known to provide a shutter with a delay-action member comprising an electronic time switch which is inserted in a circuit of a stabilized direct voltage, the opening period of the shutter sectors being controlled by variations in the time of charging or discharging of an electric capacitor. (British Patent No. 488,-499). Such a device has, however, not yet been used in connection with photographic cameras for automatic control of the exposure time by means of a photo-electric cell.

It has also been proposed to effect the automatic control of the exposure time of a photographic camera by providing a power current circuit which is closed by a light-sensitive control member in such a way that the shutter is automatically opened upon a predetermined change of radiation, for instance in relation to a predetermined intensity of illumination and operational interval of a timing apparatus provided in a flash light source (British Patent No. 807,451). Such a known device requires a highly intricate photo-electric control and is suitable for special purposes only, in particular for aerial photography at night.

Such intricate and costly devices do not provide for the fully automatic control of the exposure time in connection with photographic camera shutters according to the intensity of light illuminating the object to be photographed.

An object of the present invention is to avoid the aforementioned disadvantages by providing apparatus for automatically controlling the exposure time of photographic cameras.

In accordance with an aspect of the invention, an apparatus for automatically controlling the exposure time, includes a photo-electric cell exposed to the light illuminating the object to be photographed, with the electric current of the photo-electric cell varying the ohmic resistance of a transistor which controls a time delay circuit for operating electrically energized means controlling the shutter of the photographic camera.

More specifically, in accordance with the invention, the time delay circuit includes a selected capacitor which is charged through the transistor so that changes in the internal resistance of the latter cause corresponding changes in the time required for charging of the selected capacitor, and the electrically energized means controlling shutter of the camera is operated in response to the attainment of a predetermined charge by the selected capacitor.

In order that the invention may be clearly understood and readily carried into effect, four exemplary embodiments thereof will be described in the following with reference to the accompanying drawings, wherein FIG. 1 is a wiring diagram of a time delay circuit used in accordance with the present invention for controlling the exposure time of photographic cameras, FIG. 2 is a graph showing the relationship between electric current and illumination in a selenium photo-electric cell, FIG. 3 is graph showing the relationship between the electric current from the photo-electric cell and the resistance of the output circuit of the transistor in the time delay circuit of FIG. 1.

Figure 5:
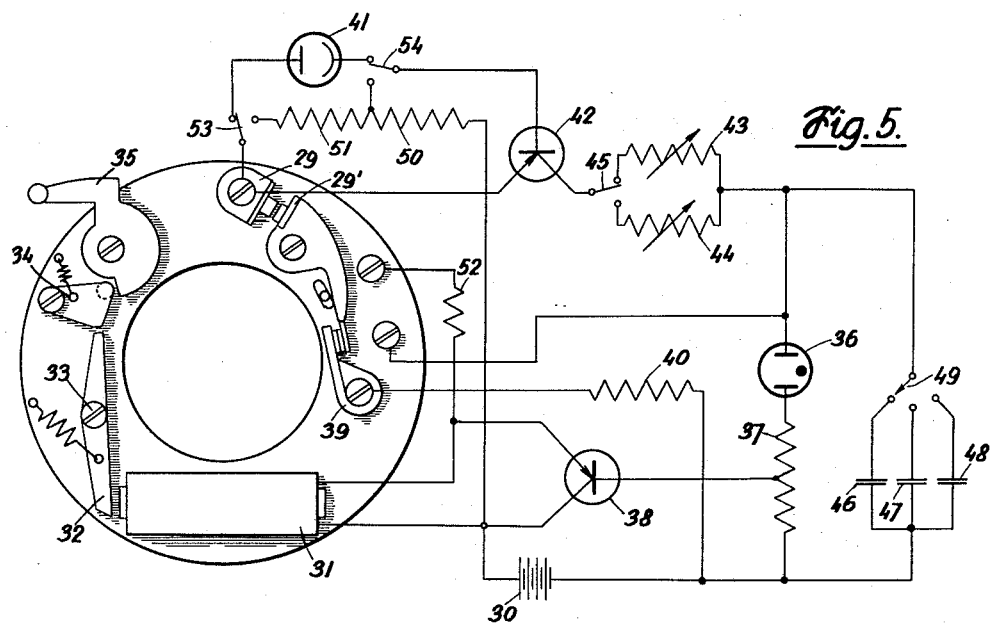
Figure 6:
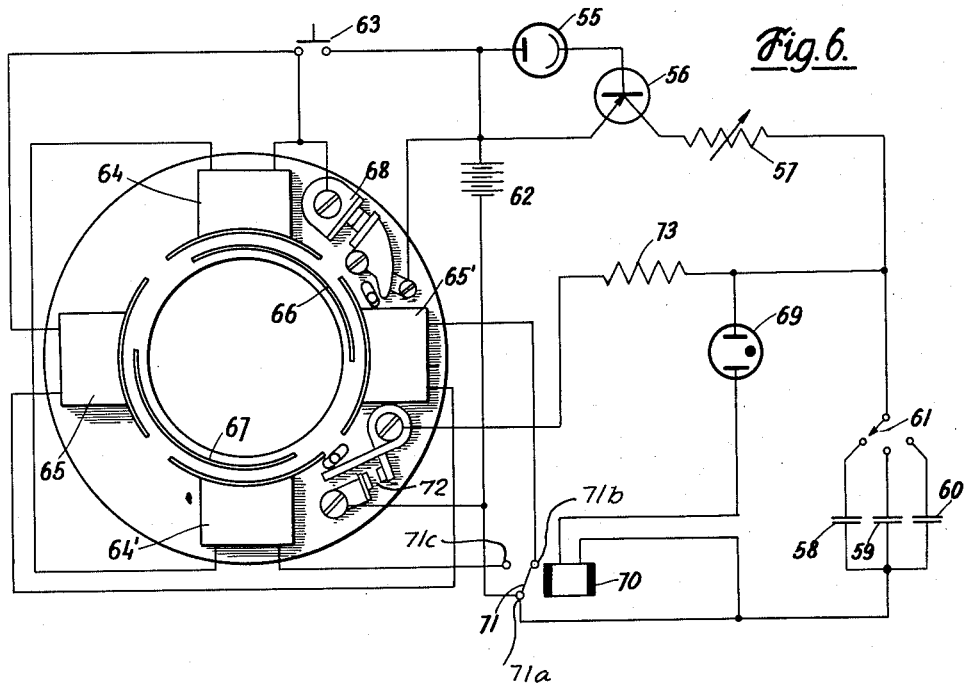
Figure 7:
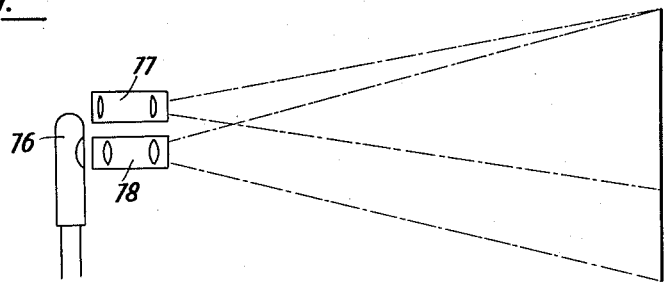

FIG. 4 is the wiring diagram of one embodiment of the present invention, wherein the time delay circuit controls the energization of electromagnetic means adapted to close the sectors of an objective shutter in a photographic camera, FIG. 5 is a wiring diagram of a second embodiment of the invention and in which the sectors are opened electromagnetically, FIG. 6 is a wiring diagram of a third embodiment of the invention with electro-magnetic means for both opening and closing the sectors of an objective shutter and FIG. 7 is a diagram showing a photo-electric device in the fourth embodiment of the invention, wherein the direction of a bundle of light rays falling on a photo-cell may be controlled.

If the capacitor is connected in series with a resistor and attached to a source of direct voltage, it will be charged to its full value according to the formula:

$$vc = V_0\left(1 - e^{-\frac{1}{RC} \cdot t}\right)$$

wherein $V_0$=direct voltage, $R$=ohmic resistance, $C$= capacity of the condenser, $t$=time and $e$=constant.

In practical operation there is usually chosen $t=RC$, said expression being termed the time constant, so that in relation to this moment there applies the following equation:

$$v_c = V_0(1-e^{-1})$$

If $$e = \frac{1}{RC} \cdot t = 0$$

i.e. if $t=\infty$, then $v_c=V_0$.

Such an RC circuit can be made to time the closing of the contacts of a relay by providing an energizing circuit for the latter which is operative upon full charging of the capacitor.

In order to improve the accuracy caused by a lower gradient of the voltage course, a gas-filled diode, such as a neon-tube is used in the energizing circuit of the relay. In such timing circuits operating without amplification of the control power a highly sensitive relay would be required and this is why they are inserted into the anode circuit of the electron discharge tube. Recently, transistor amplifiers have been used for said purpose.

In the circuit shown diagrammatically in FIG. 1, a transistor 2 has either its emitter or collector connected to ground. The photo-electric cell 1 is connected to the base plate of the transistor 2. An electric battery 3 supplies voltage to the emitter and collector of the transistor 2 over an ohmic resistance 5. The timing circuit RC comprises a variable ohmic resistance 4, an ohmic resistance 5, the inner resistance of the transistor 2 and the capacity of the electric condenser 6. Connected in parallel to the capacitor 6 is a neon-tube 7 and the coil of a relay 8.

If a bundle of light-rays strikes the photo-electric cell 1, the capacitor 6 begins to be charged. The time required for charging the capacitor 6 to a voltage $V_0$ depends on the value R of the ohmic resistances 5 and 4 and on the inner resistance between the emitter and collector of the transistor 2. Said inner resistance of the transistor 2 is controlled by the electric current from the photo-electric cell 1, said current depending on the intensity of the incident luminous flux. The photo-electric cell 1 can be of any type, such as a photo-voltaic cell or a germanium photo-cell with the respective power source.

The output current from the transistor 2 is dependent upon the inner resistance of the latter which is, in turn, dependent on the valve of the input current from cell 1. The current characteristic of the photo-electric cell 1, i.e., the dependence of current on the illumination is therefore made use of. The characteristic, that is, the relation of current J to illumination $L_x$, of some photo-electric cells is fully linear, in particular when the loading resistances are small, as shown in the diagram according to FIG. 2. The operative point of the transistor 2 is chosen so that the range Y of its utilization is in the linear portion of the characteristic $J_k=f(I_b)$ for $U_k=\text{const.}$, as indicated in the diagram of FIG. 3, where $J_k$ is the current of the collector, $J_b$ is the current of the base, and $U_k$ is the voltage of the collector in the transistor used. If not only the characteristic of the transistor 2 but also the dependence of current on the illumination of the photo-electric cell 1, are linear, the dependence of the charging current of the capacitor 6 on the illumination is linear too.

In the apparatus according to the first embodiment as illustrated in FIG. 4, contacts 9 and 10, which connect the supply of electric current from a battery 11 to the circuit, are closed during the initial opening movement of the sectors of the objective shutter of the photographic camera. In the final open position, the actuating lever 12 which opens and closes the shutter sectors, is locked by two-arm levers 13, 14, whereby the shutter remains in its fully opened position.

Variations of the electric current from the photo-electric cell 15, which is struck by the light rays emitted from the space containing the object to be photographed, influence the ohmic resistance of the transistor 16. Current from the battery 11 flows by way of closed contacts 9—10 and the internal resistance of transistor 16 over the variable resistance 17, the runner of which is coupled with the iris diaphragm of the objective and charges a selected one of the electric capacitors 18, 19 or 20. The value of the variable resistance 17 is chosen so as to compensate for the influence of the size of the diaphragm aperture in the objective of the photographic camera. As soon as the charge on the selected capacitor attains the ignition voltage of the neon-tube 21, the latter is ignited, whereupon current flows through the coil of a relay 22, the armature of which closes the contacts 23 and 24. By closing the contact 23 the coil of an electromagnet 25 is connected to the circuit of the battery 11, and the energized electromagnet 25 releases the two-arm lever 14 so that the shutter sectors are thereby closed. Due to the simultaneous closing of a contact of the switch 24, the capacitor is discharged over the ohmic resistance 26. Any one of the condensers 18, 19 or 20 can be connected in the timing circuit by means of a switch 27, the capacities of the capacitors being selected so as to correspond to the respective sensitivity of the photographic material used.

The second exemplary embodiment of the device according to the invention, as illustrated in FIG. 5, is substantially identical with that shown in FIG. 1, the only substantial difference being that, during the initial opening movement of the shutter sectors, the contacts 29 are closed so as to supply current from a battery 30 to the time delay circuit and simultaneously to the coil of an electromagnet 31 the armature 32 of which, mounted for rotation on a pin 33, is attracted, whereby the actuating lever 35 of the objective shutter is locked by means of a member 34 and the shutter sectors remain open. A resistance divider 37 is inserted in the circuit of a neon-tube 36, said resistance divider supplying an impulse to the transistor 38 upon passage of current, with the result that the coil of the electromagnet 31 is short-circuited. When the coil of electromagnet 31 is thus short-circuited, the armature 32 of the electromagnet 31 falls off and the shutter is closed. The contact 39 is actuated by the shutter mechanism during closing of the latter and serves to discharge the capacitor 46, 47 or 48 of the time delay circuit through the ohmic resistance 40.

By variations of the electric current from a photo-electric cell 41, which receives light rays from the space containing the object to be photographed, the inner ohmic resistance of a transistor 42 is governed. The time delay circuit is formed by the inner resistance of the transistor 42 as well as by the variable ohmic resistance 43, whose runner is coupled with the iris diaphragm of the objective. Further, included in the time delay circuit is one of the capacitors 46, 47 or 48 corresponding to the respective sensitivities of the film material, each capacitor being adapted for connection to the circuit by means of a three-position switch 49.

The embodiment illustrated in FIG. 6 of the drawing is adapted to effect the fully automatic opening and closing of the objective shutter sectors. In order to achieve this purpose, the embodiment of FIG. 6 has electromagnets 64 and 64' and electromagnets 65 and 65' which alternately actuate arcuate segments 66 and 67 connected to a ring controlling the movement of the objective shutter sectors. The arrangement is such that energization of the electromagnets 65 and 65' is effective to move the shutter to its open position, while energization of the electromagnets 64 and 64' is effective to return the shutter to its closed position. The shutter mechanism further has normally open contacts 68 and normally closed contacts 72 associated therewith so that, upon opening of the shutter, the contacts 68 are closed and, at the same time, the contacts 72 are opened.

In the arrangement of FIG. 6, a photoelectric cell 55 is connected to the base of a transistor 56 so as to influence the inner ohmic resistance of the latter. The collector of the transistor 56 is connected through a variable resistance 57 to a selected one of three capacitors 58, 59 and 60 by way of a three position switch 61. The capacitors 58, 59 and 60 are, in turn, connected to one terminal of a battery 62 having its other terminal connected to the photoelectric cell 55. The selected one of the capacitors 58, 59 and 60, which is chosen on the basis of the sensitivity of the photographic material employed, and the variable resistance 57 form the time delay circuit. Connected in parallel with the selected capacitor 58, 59 or 60 is a gas discharge tube 69 and the coil 70 of a relay having changeover contacts 71 which are in the illustrated position when the relay is deenergized. Thus, the movable contact 71a of the relay engages the fixed contact 71b so long as relay coil 70 is deenergized, and the movable contact 71a engages the other fixed contact 71c upon energization of the relay coil 70.

The movable contact 71a of changeover contact 71 is connected to the negative terminal of battery 62, while the fixed contact 71b is conected to electromagnet 65' which is connected in series with electromagnet 65. Electromagnet 65 is, in turn, connected to one of the normally open contacts 68, while the other of the normally open contacts 68 is connected to the emitter of transistor 56 and also to the positive terminal of battery 62. Further, a quick release push-button switch 63 is connected across the normally open contacts 68 so that, with the shutter initially in its closed condition and changeover contacts 71 disposed as shown in FIG. 6, electromagnets 65 and 65' can be energized for effecting opening of the shutter only by manual actuation of push-button switch 63.

The other fixed contact 71c of changeover contacts 71 is connected to electromagnet 64' which is connected in series with electromagnet 64, and the latter is, in turn, also connected to the positive terminal of battery 62 by way of the normally open contacts 68 which are closed upon initial movement of the shutter towards its open position. Thus, the electromagnets 64 and 64' are energized for moving the shutter to its closed position only when contacts 68 are closed, by reason of the shutter being open, and relay coil 70 is energized to actuate the changeover contacts 71 so that its movable contact 71a then engages the fixed contact 71c.

The above described arrangement of FIG. 6 operates as follows:

Prior to the actuation of push-button switch 63 which initiates an exposure, the selected capacitor 58, 59 or 60 is continuously discharged or short-circuited through the parallel circuit constituted by the resistance 73 of low value and the normally closed contact 72 so that, even if light strikes the photoelectric cell 55, and thereby decreases the internal resistance of transistor 56, the selected capacitor 58, 59 or 60 will not be charged to the ignition voltage of the gas discharge tube 69.

Upon closing of push-button switch 63, the circuit is completed between battery 62 and electromagnets 65 and 65' so that the latter are energized to effect movement of the shutter to its open position. During initial opening movement of the shutter, the originally open contacts 68 are closed, while the originally closed contacts 72 are opened, as shown in FIG. 6. Thus, upon release of push-button switch 63, the contacts 68 act as hold contacts to complete the energizing circuit for the electromagnets 65 and 65' so long as relay coil 70 is deenergized to maintain its changeover contacts 71 in the illustrated position, that is, with movable contact 71a in engagement with fixed contact 71b.

Since the initial movement of the shutter toward its open position serves to open the normally closed contacts 72, the short circuit for the selected capacitor 58, 59 or 60 through the resistance 73 is interrupted and charging of the selected capacitor commences at a rate determined by the setting of the variable resistance 57 and by the intensity of the light falling upon the photocell 55 which, in turn, determines the internal resistance of the transistor 56 in series with the resistance 57. When the charge on the selected capacitor 58, 59 or 60 reaches the ignition voltage of the gas discharge tube 69, a circuit is completed through the latter for energizing the relay coil 70 which thereby actuates its changeover contacts 71 so that the movable contact 71a moves away from fixed contact 71b and into engagement with fixed contact 71c. Thus, the energization of electromagnets 65 and 65' is interrupted, and the circuit is completed for energizing the electromagnets 64 and 64' through engaged contacts 71a and 71c and through the closed contacts 68 so that the shutter is moved towards its closed position. When the shutter reaches its closed position, contacts 68 are again opened, to interrupt the circuit for energizing electromagnets 64 and 64', while contacts 72 are again closed so that the selected capacitor 58, 59 or 60 can discharge by way of resistance 73. Upon discharge of the selected capacitor by way of resistance 73, the charge on the selected capacitor falls below the ignition voltage of gas discharge tube 69 so that the energizing circuit for the relay coil 70 is again interrupted and the changeover contacts 71 of the relay are returned to the normal or deenergized position shown in FIG. 6 where the movable contact 71a enages the fixed contact 71b. Thus, the arrangement is returned to its original position in preparation for the initiation of the next exposure by depression of push-button switch 63.

The device according to embodiment of the invention shown in FIG. 5, can be supplemented by throw-over switches 45, 53 and 54, so that the photo-electric cell 41 can be disconnected from the time delay circuit and replaced by a resistance divider 50, 51, adapted for the control of the transistor 38, and, at the same time, the variable resistance 43 can be put out of operation and replaced by a variable resistance 44, the latter being controlled by a hand-operated button, which is not shown in the drawing and which is provided with a scale showing the exposure times. Thus the automatic exposure time control may be made inoperative and the time of exposure can then be adjusted by means of the button which controls the variable resistance 44.

The device of FIG. 4 may further be supplemented by a sensitive meter 74 calibrated directly with indications of the exposure time and adapted to be alternately connected by the throw-over switch 75, in series with variable resistance 17. Such provision of the meter 74 in the circuit enables the operator to ascertain the exposure time before taking the shot.

The total area of the photographed object consists sometimes of a relatively large completely dark area (objects having a low reflecting power) or a large light-colored area (objects with a high reflecting power) or the objects may have some portions which are illuminated either too little or too much. This would considerably influence the correct determination of the exposure time, if the control were carried out by allowing the light rays to fall on the photo-cell from the entire area of the non-uniformly illuminated object space. In order to ascertain the correct exposure time under such exceptional conditions it is necessary that the photo-cell should receive light-rays from a definite part only of the object space. This may be achieved by various adjustments and mountings of the photo-cell, such as by means of the arrangement shown in FIG. 7, where in front of the photo-cell 76 there are mounted two or more objectives 77 and 78 having different focal lengths, so that any one of them can be placed in front of the photo-cell 76, or deflected to an inoperative position.

Since the electric component parts of the circuits embodying this invention have very small dimensions, the whole device may preferably be installed in the casing of the photographic camera, or in the housing of the objective shutter in place of the usual mechanical timing device for the shutter.

We claim:

1. In a photographic camera having an objective shutter; apparatus for controlling the exposure time of the camera comprising means for opening the shutter, a photoelectric cell exposed to light reflected from the object to be photographed to emit an electric current varying in accordance with the intensity of the reflected light, a transistor receiving electric current from said cell so that the internal resistance of said transistor is varied by changes in said electric current from the photoelectric cell, at least one capacitor, circuit means for charging said capacitor through said transistor upon opening of the shutter so that the time required to charge said capacitor to a predetermined value is dependent upon said internal resistance of the transistor and hence upon the intensity of the reflected light, and electrically operated means for closing the shutter in response to the charging of said capacitor to said predetermined value.

2. In a photographic camera having an objective shutter; apparatus for controlling the exposure time as in claim 1, further comprising a variable resistance interposed between said transistor and capacitor and having its resistance value varied in accordance with the size of the opening of the camera.

3. In a photographic camera having an objective shutter; apparatus for controlling the exposure time as in claim 1, further comprising additional capacitors, and switch means for selectively connecting one of said capacitors in said circuit means, the first mentioned capacitor and said additional capacitors having different values of capacitance corresponding to the sensitivities of different photographic films to be used in the camera.

4. In a photographic camera having an objective shutter; apparatus for controlling the exposure time as in claim 1, further comprising a control circuit for said electrically operated means including a gas discharge tube connected in parallel with said capacitor and being ignited when said capacitor is charged to said predetermined value.

5. In a photographic camera having an objective shutter; apparatus for controlling the exposure time as in claim 1, wherein the shutter has mechanical locking means for holding the shutter in its open position, and said electrically operated means includes an electromagnet operative, when energized, to release said locking means and thereby permit closing of the shutter, and energizing circuit means for said electromagnet including a relay having normally open contacts which are closed to energize said electromagnet upon operation of said relay in response to charging of said capacitor to said predetermined value.

6. In a photographic camera having an objective shutter; apparatus for controlling the exposure time as in claim 5, wherein said relay has a coil connected in series with a gas discharge tube across said capacitor, said tube igniting upon charging of said capacitor to said predetermined value to thereby supply current to said coil for operating said relay.

7. In a photographic camera having an objective shutter; apparatus for controlling the exposure time as in claim 6, further comprising additional normally open contacts in said relay connected across said capacitor to discharge the latter upon closing of said additional contacts in response to operation of said relay.

8. In a photographic camera having an objective shutter; apparatus for controlling the exposure time as in claim 1, further comprising an electric meter, and means for selectively connecting said meter to said circuit means in place of said capacitor, said meter being calibrated to indicate the necessary exposure time as a function of the current flow through said transistor.

9. In a photographic camera having an objective shutter; apparatus for controlling the exposure time as in claim 1, wherein the shutter has electromagnetically operated means energized in response to opening of the shutter for holding the latter in its open position, and said electrically operated means for closing the shutter includes means short-circuiting said electromagnetically operated means upon said capacitor being charged to said predetermined value thereby permitting closing of the shutter.

10. In a photographic camera having an objective shutter; apparatus for controlling the exposure time as in claim 9, wherein said means for short-circuiting said electromagnetically operated means includes an additional, normally non-conducting transistor in parallel with the latter, and circuit means for rendering said additional transistor conductive including a gas discharge tube connected across said capacitor and igniting when the latter is charged to said predetermined value.

11. In a photographic camera having an objective shutter; apparatus for controlling the exposure time as in claim 1, wherein the shutter has first and second electromagnetic means operative, when energized, to respectively open and shut the shutter, and wherein said electrically operated means for closing the shutter includes a relay which is energized in response to the charging of said capacitor to said predetermined value and which has normally opened and closed contacts changed over to closed and opened positions, respectively, upon energization of the relay, said first and second electromagnets being connected to said normally closed and opened contacts, respectively, for energization upon closing of the respective contacts.

12. In a photographic camera having an objective shutter; apparatus for controlling the exposure time as in claim 11, wherein said relay is energized through a gas discharge tube connected across said capacitor and being ignited when the charge of said capacitor reaches said predetermined value.

13. In a photographic camera having an objective shutter; apparatus for controlling the exposurer time as in claim 12, further comprising a discharge circuit for discharging said capacitor and first normally open switch means interposed in said discharge circuit and being closed to complete the latter in response to the closing of the shutter.

References Cited in the file of this patent

UNITED STATES PATENTS

| | | |
|---|---|---|
| 2,179,717 | Fedotoff | Nov. 14, 1939 |
| 2,668,474 | Rogers | Feb. 9, 1954 |